United States Patent [19]

Takeuchi et al.

[11] Patent Number: 4,759,536
[45] Date of Patent: Jul. 26, 1988

[54] CLAMPING DEVICE

[75] Inventors: Hirosato Takeuchi; Osahiko Miyazaki; Yasuo Kazama; Naoya Kurihara, all of Tokyo, Japan

[73] Assignee: Nitto Kohki Co., Ltd., Tokyo, Japan

[21] Appl. No.: 103,644

[22] Filed: Oct. 2, 1987

[30] Foreign Application Priority Data

| Oct. 4, 1986 | [JP] | Japan | 61-236645 |
| Oct. 30, 1986 | [JP] | Japan | 61-256910 |
| Oct. 30, 1986 | [JP] | Japan | 61-256911 |

[51] Int. Cl.$^4$ .............................................. B23Q 1/00
[52] U.S. Cl. ..................................... 269/303; 269/309
[58] Field of Search ............... 269/309, 310, 900, 235, 269/236, 47, 303

[56] References Cited

U.S. PATENT DOCUMENTS 4,382,589  5/1983  Cammi ................................. 269/50
4,664,366  5/1987  Lane et al. ........................... 269/303

FOREIGN PATENT DOCUMENTS

745645  7/1980  U.S.S.R. ............................... 269/309

Primary Examiner—Robert C. Watson
Attorney, Agent, or Firm—Nixon & Vanderhye

[57] ABSTRACT

A clamping device has a clamp base having a first clamping element. A second clamping element faces the first clamping element, which moves toward the first clamping element and cooperates with the first clamping element to hold an article. A shaft is rotatably provided in the crank base such that it extends substantially at right angles to the directions in which the second clamping member moves. An eccentric is formed on the shaft. A crank lever is supported at one end by a crank holder connected to the second clamp element and fitted at the other end on the eccentric. As the shaft rotates, the second clamping element is moved towards or away from the first clamping element so as to hold the article between the elements or release the article from them.

10 Claims, 7 Drawing Sheets

CLAMPING DEVICE

BACKGROUND OF THE INVENTION

1. Field of the Invention

This invention relates to a clamping device which holds an article to be clamped accurately and firmly and which can finely adjust the distance between clamping faces of the clamping device according to the thickness tolerance of the article to be clamped.

2. Description of the Prior Art

In a numerically controlled machine tool such as a machining center, a pallet, on which a work is mounted, is used to improve the efficiency of mounting a work on, and demounting the same from the worktable of the machine tool. In this case, the positioning and clamping accuracies of the pallet on the worktable has a direct influence on the machining accuracy of a workpiece. Therefore, a clamping device, to which a pallet is changeably positioned and clamped, may be secured to the worktable of the machine tool.

Such a clamping device has a vertically movable clamp plate on a clamp base fixed to the worktable of the machine tool. When a pallet is transferred to the clamp plate and placed in a predetermined position, engagement elements formed on the underface of the pallet are clamped between the clamp plate and the clamp base.

When a pallet is clamped, it must be accurately positioned on the clamping device. For this reason, the clamping device is provided with a positioning pin, which is inserted into a recess formed in the pallet by a hydraulic, pneumatic or electromagnetic actuator.

When a pallet is transferred onto the clamp plate, it is necessary to temporarily position the pallet thereon so that the recess of the pallet is located right above the positioning pin. Therefore, there is provided a stop, against which the pallet being transferred to the clamp plate abuts at its forward end to be set in a required position on the clamp plate or an engagement lever which is electromagnetically driven when the pallet transfer is detected.

However, with the mechanism using a pin, when the pallet abuts against the stop for the temporary positioning, the stop prevents only the further forward movement of the transferred pallet. Therefore, it is necessary to continuously press the pallet against the stop and to hold the panel in the temporary position until the positioning pin is inserted into the pallet. This means that a specific operation is required, in which the pallet is held urged against the stop.

Further, the mechanism using an electromagnetically driven engagement lever requires means for detecting the pallet transfer of a pallet plate and an actuator for driving the engagement lever, leading to a bulky structure. Further, for lowering the clamp plate, a hydraulic or pneumatic actuator or a lead screw mechanism is used.

The inventors have studied a clamping device which simply clamps and releases an article having a predetermined thickness only by turning a clamp operating handle through an angle less than one revolution. The clamping device comprises a shaft fixed by the clamp operating handle and rotatably supported on a cramp base, and an eccentric integral with the shaft and fitted in one end of a crank lever having the other end integrally connected to the crank base movable vertically with respect to the clamp base.

In the clamping device of this type, the clamp plate is vertically moved in accordance with the eccentricity of the eccentric. With this type of the clamp device, however, the clamp operating handle must be turned until the clamp plate is lifted to its lowermost position in order to clamp the article completely. Therefore, the distance between the clamp base and the clamp plate at its lowermost position must be set extremely accurately.

In order to set the distance to such a high accuracy, however, various components that determine the distance must be manufactured at a very high accuracy. Moreover, even if the machining accuracy of individual components is improved, cumulative assembling errors would appear. Therefore, the clamping device of this type is inevitably low in the efficiency of manufacture and yield.

When a pallet is temporarily positioned in contact with the stop, a specific operation of pressing the pallet against the stop is required to maintain the pallet in the temporarily positioned state. Further, a positioning pin engaged with the temporarily positioned pallet projects upright from the clamp base. In order to project the positioning pin from the clamp plate to an extent necessary for the engagement of the pallet, the clamp plate must be lowered by a comparatively large distance equal to the extent of projection. Therefore, the maximum height level of the work to be machined, which is determined by the height position of the machining head of the machine tool, is reduced by an amount corresponding to the descent of the clamp plate, thus lowering the machining capacity of the machind tool.

SUMMARY OF THE INVENTION

An object of the invention is to provide a clamping device, which can highly accurately hold an article having high manufacturing tolerance and permits fine adjustment of the distance between clamping faces, between which the clamped portions of the article are clamped in accordance with the accuracy of the thickness of the clampable member.

Another object of the invention is to provide a clamping device, which temporarily holds a pallet or the like transferred to a clamp plate in a predetermined position on a clamp plate and then reliably position the same to the clamp plate.

To attain the above objects of the invention, there is provided a clamping device, which comprises a clamp base having a first clamping element on one surface, a second clamping element facing the first clamping element, movable toward and away from the first clamping element and co-operating with the first clamping element to hold an article when moved toward the first clamping element, a shaft rotatably mounted on the crank base and extending substantially at right angles to the directions, in which the second clamping member is moved toward and away from the second clamping member, an eccentric formed on the shaft, a crank holder connected to the second clamping element for adjusting the distance between the first and second clamping members, and a crank lever having one end pivoted to the eccentric and the other end supported on the crank holder.

The clamp base may have an engagement unit, which receives a pallet transferred onto the clamp plate and temporarily secures it to the clamp plate when the clamp plate is spaced apart most from the clamp base and is disengaged from the pallet when the positioning pins are inserted into the positioning holes upon the movement of the clamp lever toward the clamp base.

BRIEF DESCRIPTION OF THE DRAWINGS

This invention can be fully understood from the following detailed description with reference to the accompanying drawings, in which.

DETAILED DESCRIPTION OF THE PREFERRED EMBODIMENTS

Figure 1:
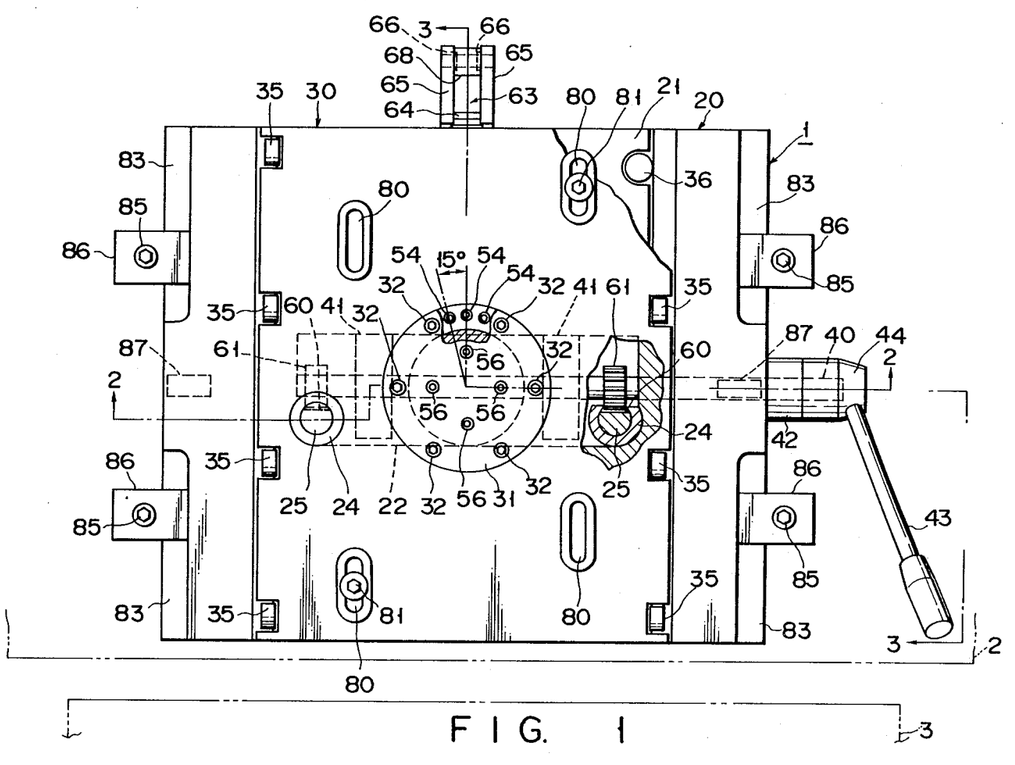
FIG. 1 is a plan view showing an embodiment of the clamping device according to the invention.

FIG. 1 shows an embodiment of clamping device 1 according to the invention. The device is secured to worktable 2 of a machine tool. It receives a pallet carrying a work to be machined from pallet changer 3, which serves to change and transfer pallets with works, and holds the received pallet in a machining position. After the work has been machined, it transfers the pallet with the machined work to pallet changer 3.

Figure 7:
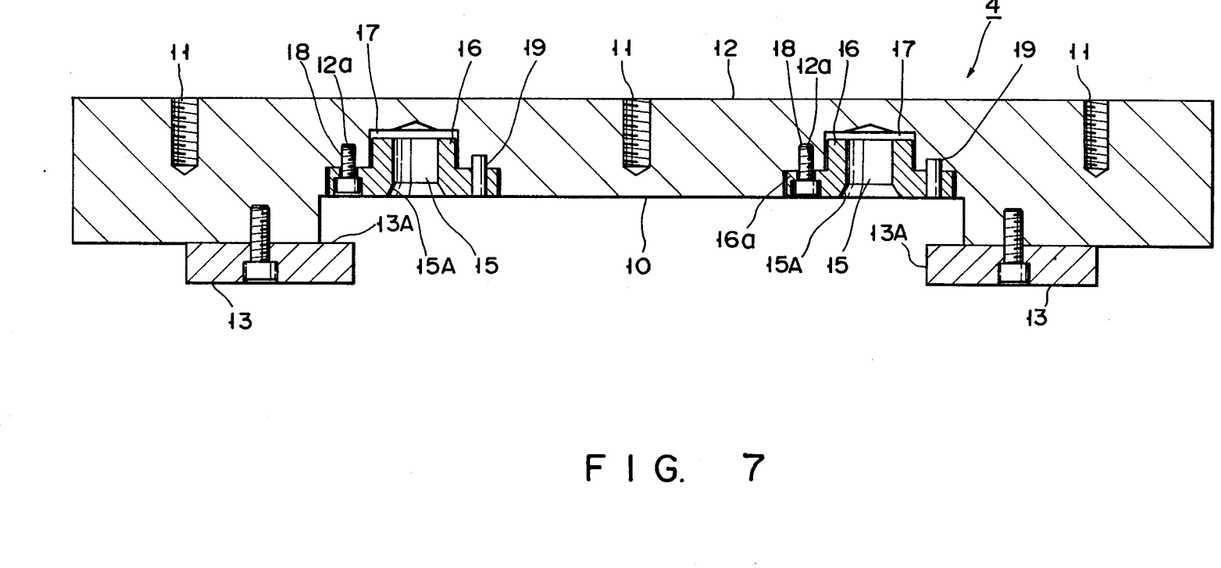
FIG. 7 is a cross-sectional view showing a pallet applicable to the clamping device according to the invention.

First, an example of pallet 4 which is applicable to clamping device 1 according to the invention will be described with reference to FIG. 7.

Pallet 4 comprises substantially rectangular pallet base 12, which has recess 10 having a comparatively large width formed in a central portion of the bottom face and also has a plurality of female thread holes 11 formed in the upper face for detachably mounting a work (not shown) on it. A pair of plates 13 are fixed to the bottom of pallet base 12 such that they project toward recess 10. Projecting clamped portions 13A of clamping plates 13 are clamped by clamping device 1 to hold pallet 4 on worktable 2. Their thickness tolerance is very high (e.g., 1/1,000 to 2/1,000 mm).

The bottom face of recess 10 is provided with a pair of positioning holes 15 for positioning pallet 4 on worktable 2 when a pair of positioning pins 25 (described later) are inserted in positioning holes 15. Each positioning hole 15 is not directly formed in pallet base 12. Instead, it is formed in flange-like bush 16 which is inserted in mounting each hole 17 formed in pallet base 12. Bush 16 is loosely received in each hole 17. Male screws 18 are loosely fitted in holes formed in flange 16a of bush 16 and engage threaded holes 12a formed in pallet 4, whereby bush 16 is fixed by screw 18 to pallet base 12. The positioning accuracy of pallet 4 should be very high in order to improve the manufacturing accuracy of the work machined by the machine tool. To this end, the insertion tolerance between positioning pin 25 and positioning hole 15 should be of the order of 1/1,000 to 2/1,000 mm, or the like.

Generally, the tolerance of the center-to-center distance between positioning holes 15 is stricter than the insertion tolerance between positioning hole 15 and positioning pin 25.

In this embodiment, however, a pair of bushes 16 each having positioning hole 15 formed with a predetermined insertion tolerance are loosely inserted in mounting holes 17, and then the center-to-center distance between positioning holes 15 is adjusted to a desired value before securing bushes 16 to pallet base 12. Therefore, the machining accuracy of positioning hole 15 of bush 16 need not be so high.

A jig is used for the adjustment of the center-to-center distance between positioning holes 15 and the accurate mounting of bushes 16 in pallet base 12. Bushes 16 are first inserted in mounting holes 17, and positioning pins 25 are set upright on the jig at a center-to-center distance having such a high tolerance as 1/1,000 to 2/1,000 mm. Then, pins 25 are inserted in respective positioning holes 15. The center-to-center distance of positioning holes 15 is set at the same accuracy as that of positioning pins 12 (e.g., 1/1,000 to 2/1,000 mm). Subsequently, screws 18 are inserted in corresponding holes 16b (for example, three) formed in flange 16a of bush 16. The head and threads of screw 18 are both smaller in diameter than hole 16b. Screws 18 engage threaded holes 12a formed in mounting hole 17 of pallet base 12. In this way, each bush 16 is temporarily secured to pallet base 12 in respective mounting hole 17. Afterwards, a hole is drilled into flange 16a of bush 15 and pallet base 12, and pin 19 is driven into the hole. Thus, bush 16 is finally fixed to pallet base 12 at a required positional accuracy.

Figure 2:
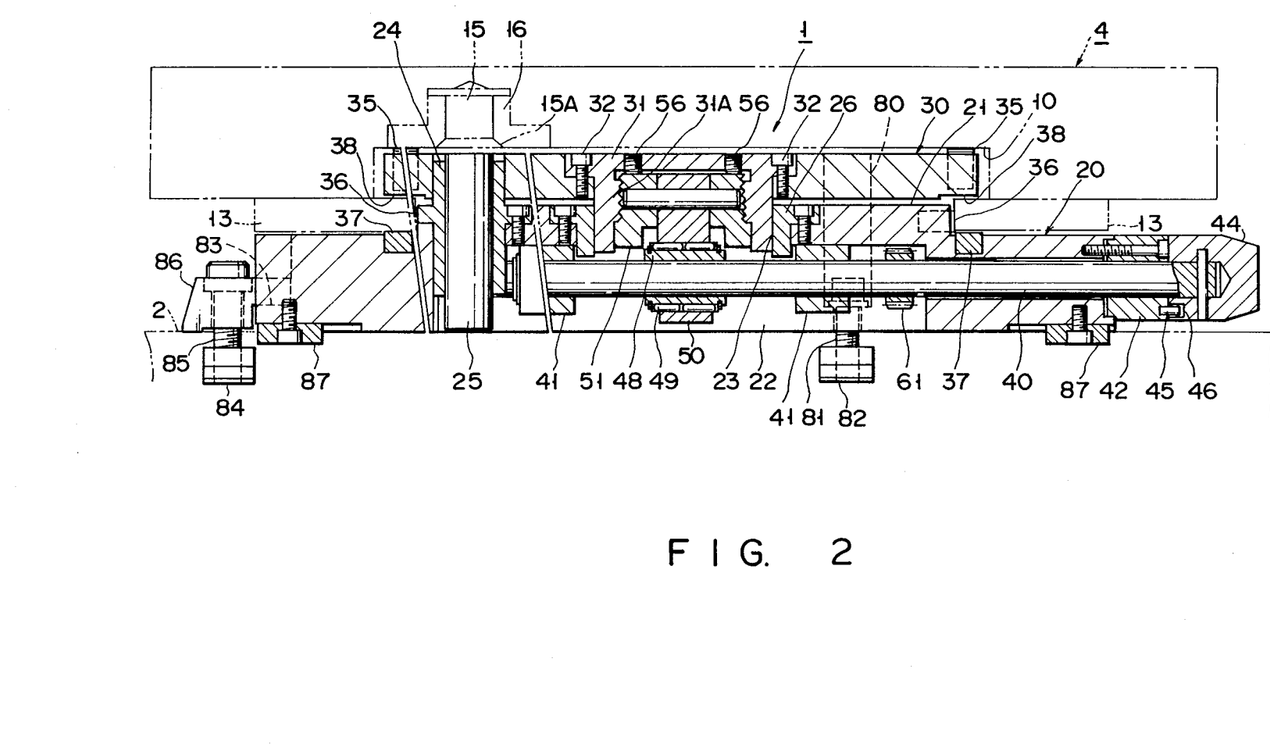
FIG. 2 is a cross-sectional view taken along line 2—2 in FIG. 1, showing a pallet in an unheld state.
Figure 3:
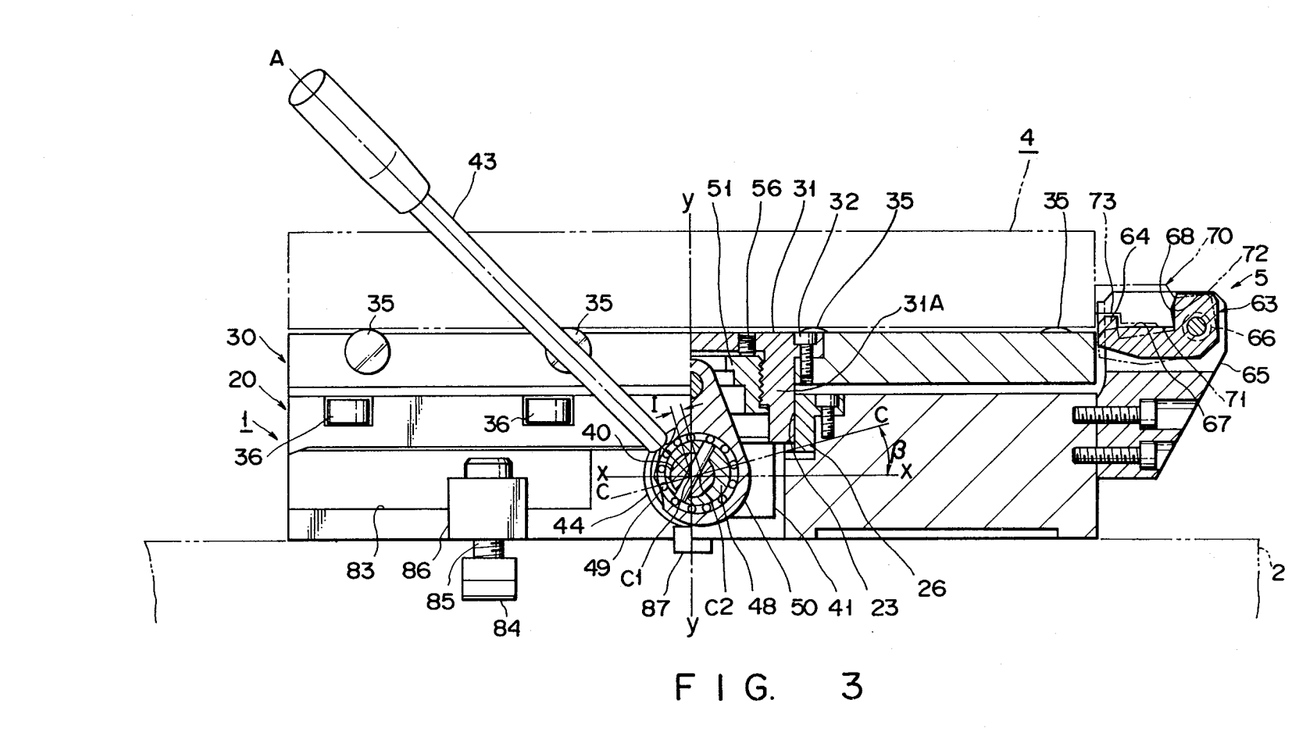
FIG. 3 is a cross-sectional view taken along line 3—3 in FIG. 1, showing the pallet in the unheld state.

Now, clamping device 1 will be described in detail. FIG. 2 is a cross-sectional view taken along line 2—2 in FIG. 1, and FIG. 3 is a cross-sectional view taken along line 3—3 in FIG. 1. Substantially rectangular clamp base 20 has central raised portion 21, and is secured to worktable 2 of the machine tool. The bottom of raised portion 21 is formed with central recess 22. Center holder 26 having a large central hole 23 extends from the upper face of the raised portion 21 to recess 22, and is fixed to clamp base 20. A pair of hollow cylindrical guide bushes 24 (only one thereof shown in FIG. 2) extend through raised portion 21 at the front and rear end portions of central recess 22, and project upwards from raised portion 21. The center-to-center distance between guide bushes 24 is set to be equal to the center-to-center distance between positioning holes 15 in pallet 4. In each guide bush 24 is inserted positioning pin 25, which is movable in the axial direction of guide bush 24.

Clamp plate 30 is substantially rectangular and has a greater width than raised portion 21 of clamp case 20. Clamp plate 30 has a central opening. Center block (i.e., adjustment support block) 31 penetrates the central hole and is secured at its flange by a plurality of (e.g., six) set screws 32 to clamp plate 30. Screws 32 are arranged at circumferentially regular intervals. In this embodiment, set screws 32 are spaced apart at an interval of 60° on a circle coaxial with the central hole of clamp plate 30. Hollow cylindrical boss portion 31A of center block 31 is rotatably fitted in central hole 23.

Guide bushes 24 are slidably extended through clamp plate 30 at its both sides such that they guide the vertical movement of clamp plate 30 with respect to clamp base 20. In this structure for supporting clamp plate 30 and moving the same vertically, central opening 23 having a large diameter and hollow cylindrical boss 31A of center block 31 play an important role in the vertical movement of clamp plate 30 without being inclined with respect to clamp base 20. Since guide bushes 24 can support clamp base 30 at only two positions, they cannot sufficiently prevent clamp plate 30 from tilting. They only serve to prevent rotation of clamp plate 30 with respect to clamp base 20. Therefore, in order to support clamp plate 30 for vertical movement without tilting, it is only necessary to provide a high accuracy of the insertion tolerance between central hole 23 and central boss 31A, and a very high accuracy is not needed for the insertion tolerance of clamp plate 30 with respect to guide bush 24. For this reason, it is possible to simplify the structure for supporting clamp plate 30 for vertical movement without tilting and reduce the number of steps of machining for manufacturing such support structure.

To support and guide pallet 4, clamping device 1 is provided with a plurality of guide rollers 35 arranged in a row on clamp plate 30. Guide rollers 35 support pallet 4 at its recess 10. Also, a plurality of guide rollers 36 are provided on each side of raised portion 21 of clamp base 20 such that they support and guide the corresponding edge of each clamped plate 13 of pallet 4 sidewise. The lower face of projecting portion 13A of each plate 13 faces support rail 37 provided as a first clamping element on that portion of the upperface of clamp base 20 which is adjacent to the corresponding side of raised portion 21. The upper face of projecting portion 13A of each clamped plate 13 faces support face 38 formed as a second clamping element on that portion of the bottom of clamp plate 30 which is continuous with its corresponding lateral side.

Shaft 40 is supported by a pair of bearings 41 provided in central recess 22 of clamp base 20. One end of shaft 40 projects from boss stop 42 fixed to the corresponding lateral side of clamp base 20. To its projecting end is secured handle boss 44, from which clamp operation handle 43 extends. Stop pin 45 projects from the outer end face of boss stop 42. The inner end face of handle boss 44 that faces stop pin 45 is formed with an arcular groove 46, in which the projecting end of stop pin 45 is received to define the rotational angle range of handle boss 44. Thus, shaft 40 can be rotated above worktable 2 of the machine tool in an angle range A-B by clamp operation handle 43.

Figure 5:
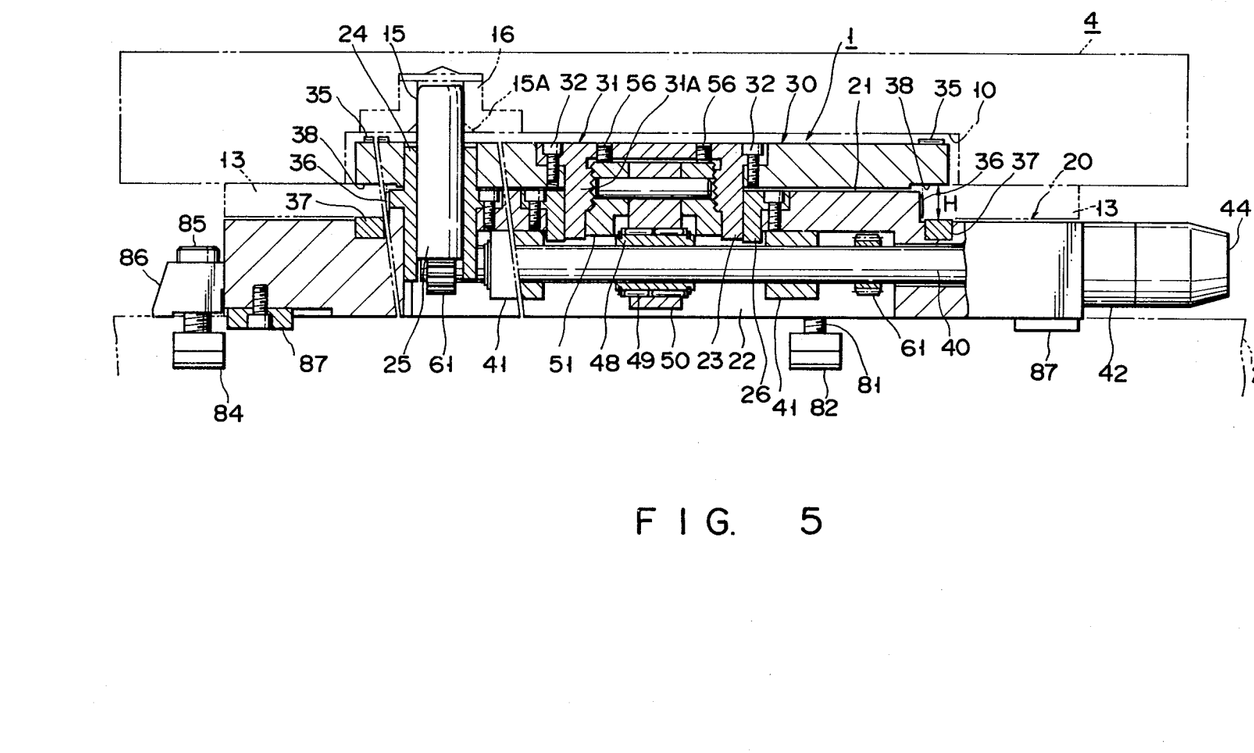
FIG. 5 is a cross-sectional view taken along line 2—2 in FIG. 1 showing the pallet in a held state.
Figure 6:
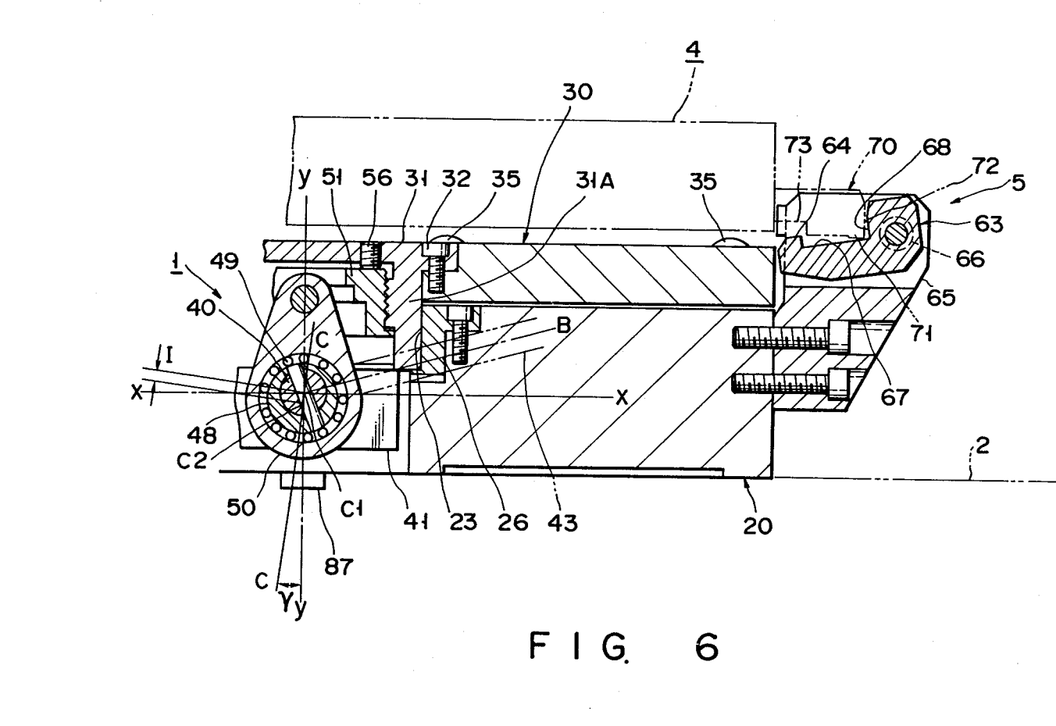
FIG. 6 is a cross-sectional view taken along line 3—3 in FIG. 1, showing the pallet in the held state.

As shown in FIGS. 3, 5 and 6, eccentric 48 is formed on the center of shaft 40. I is the eccentricity between the axis of eccentric 48 and the axis of shaft 40. One end of crank lever 50 is fitted via needle bearing 49 on eccentric 48. The other end of crank lever 50 is pivoted to clamp holder 51. Clamp holder 51 is screwed into central boss 31A of center block 31.

Figure 4:
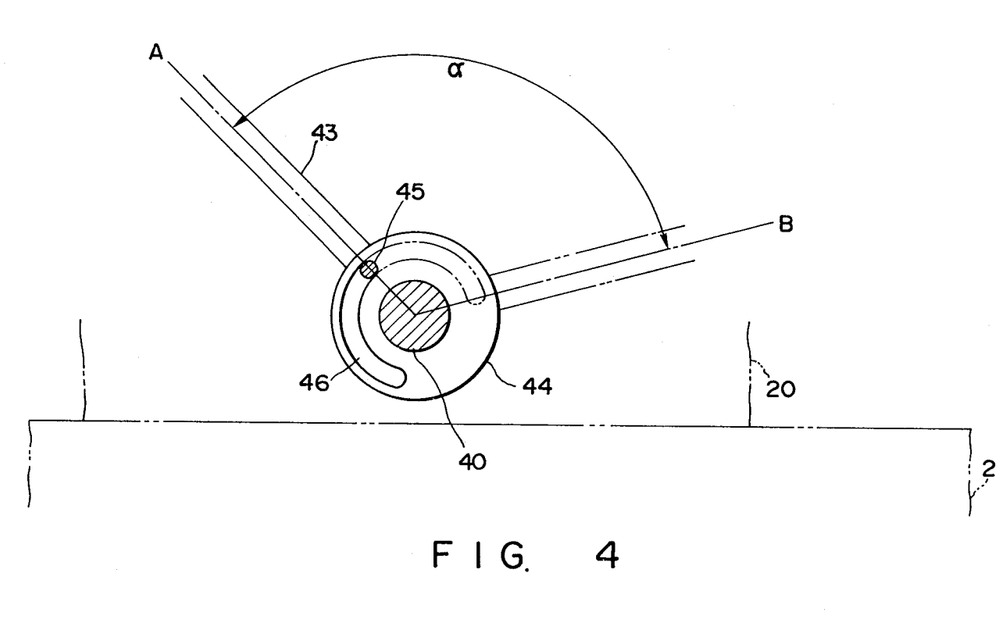
FIG. 4 is a fragmentary cross-sectional view showing a mechanism for controlling the rotational range of a shaft of the clamping device.

When clamp operation handle 43 assumes position A in FIG. 3, that is, when stop pin 45 takes position A in contact with the right end of arcular groove 46 as shown in FIG. 4, axis C2 of eccentric 48 is located above axis C1 of shaft 40, and the line connecting both axes C1 and C2 (hereinafter referred to as axis line C—C) is inclined counterclockwise through angle $\beta$ from the x-axis of a Cartesian coordinates whose origin is axis C1 of shaft 40. In this state, the leftward rotation of shaft 40 is restricted by stop pin 45 and the right end of groove 46, and clamp plate 30 is at the highest level with respect to clamp base 20. In this state, guide rollers 35 support pallet 4 such that the corresponding faces of plate 13 do not contact support rail 37 or clamping face 38, whereby pallet 4 can be transferred into and out of clamping device 1.

When clamp operation handle 43 is turned rightwards through angle $\alpha$ from its position A in FIG. 3 to position B in FIG. 6 until stop pin 45 in FIG. 4 contacts the left end of arcular groove 46, clamp plate 30 is lowered from the position in FIG. 3 together with crank lever 50 by distance (I sin $\beta$ + I cos $\gamma$) to assume a clamping position. Here, I is the eccentricity between shaft 40 and eccentric 48, and angle $\gamma$ is a small angle between axis line C—C and y-axis in the state of FIG. 6. At this time, distance H from the upperface of support rail 37 to support face 38 is smaller than the thickness of plates 13. Thus, plates 13 of pallet 4 are clamped between support rails 37 and support faces 38 by rotating handle 43 rightwards.

When clamp operation handle 43 is turned rightwards from the state of FIG. 3 through angle $(\pi/2+\beta)$ (which is slightly smaller than angle $\beta$) to let axis line C—C and y-axis coincide during the operation of rotating clamp operation handle 43 from position A to position B, clamp plate 30 is lowered from the state of FIG. 3 together with crank lever 50 by distance (I+I sin $\beta$) and assumes the lowest level position. In other words, when clamp plate 30 assumes the clamping position shown in FIG. 6 and pallet 4 is held clamp plate 30 is slightly higher than its lowermost position. Thus, in the clamping position of clamp plate 30 as shown in FIG. 6, eccentric 48 receives a force tending to rotate it in the clockwise direction due to a wedging action produced between eccentric 48 and crank lever 50. Therefore, unless clamp operation handle 43 is positively turned in the counterclockwise direction, the clamped state of pallet 4 is not loosened even if shaft 40 would tend to rotate clockwise or counterclockwise by vibrations or other causes. Accordingly, the wedging action between eccentric 48 and clamp lever 50 locks clamp operation handle 43 in position B.

In order to firmly clamp plates 13 of pallet 4 between support rails 37 and support faces 38 when clamp plate 30 takes the clamping position shown in FIG. 6 by setting handle 43 to position B, it is required to properly select distance H between the upper face of support rail 37 and support face 38 so as to meet the thickness of plate 13. For firm clamping, the difference between the thickness of plate 13 and distance H should be within the range of elasticity of related components. Thus, distance H should be set at comparatively high accuracy. As described above, clamping device 1 has a structure, in which crank lever 50 is connected to clamp plate 30 by center block 31 fixed to clamp plate 30, and crank holder 51 screwed in center block 31 and connected to crank lever 50. Therefore, even if manufacturing errors of the components or cumulative assembling errors exist in the components between shaft 40 and clamp plate 30 which define distance H, such errors can be cancelled by adjusting the height of clamp plate 30 with respect to crank holder 51 by turning center block 31.

In this embodiment, in order to make fine adjustment of the height of clamp plate 30 with respect to crank holder 51, twenty-four female screws 54 are formed in clamp plate 30 coaxially with center block 31 at an interval of 15°. Six set screws 32 engage six female screws 54. Therefore, it is possible to permit fine adjustment of the screwing height of clamp plate 30 with respect to crank holder 51 for every 1/24 screw pitch of clamp plate 30. When the screw pitch is 1 mm, the minimum adjustment height of clamp plate 30 is approximately 0.04 mm.

After this fine adjustment, push screws 56 are provided in the upper wall of counter block 31 and push crank holder 51 downward such that the screw flanks of center block 31 and crank holder 51 closely contact with each other.

When the height of clamp plate 30 with respect to crank holder 51 is finely adjusted by turning center block 31, manufacturing errors of the components defining the distance H and cumulative assembling errors thereof can be easily cancelled. Moreover, with this height adjustment arrangement, it is unnecessary to manufacture the components at a very high accuracy. This leads that the clamping device is easily manufactured.

In this embodiment, center block 31 is rotatable with respect to clamp plate 30 and projects perpendicularly downwardly from the bottom of clamp plate 30. Hollow boss 31 of center block 31 is inserted in central hole 23 of clamp base 20 having a comparatively large diameter such that it is perpendicular to clamp base 20. Thus, clamp plate 30 is not inclined when its vertical adjustment is made. In other words, the distances between support rail 37 and support surface 38 do not differ from each other at the right and left sides of clamp base 20. This facilitates the height adjustment.

In order to project positioning pin 25 from or retract into the upper face of clamp plate 30 as crank plate 30 is lifted or lowered, axially extending rack 60 is formed on the outer periphery of each of two positioning pins 25, and a pair of gears 61 fixed to shaft 40 are meshed with the respective racks 60 (FIG. 1). Thus, when clamp operation handle 43 assumes position A in FIG. 3, each positioning pin 25 is not projected from the upper face of crank plate 30, as shown in FIG. 2. When clamp operation handle 43 is turned from position A to position B in FIG. 6, clamp plate 30 is lowered according to small eccentricity I between shaft 40 and eccentric 48, thereby holding pallet 4. Meanwhile, each positioning pin 25 is raised by a comparatively large distance proportional to the extent of rotation of gears 61, which has as large pitch radius as several to several tens times of eccentricity I, and is received in positioning pin 15 of pallet 4 as shown in FIG. 5. Accordingly, positioning pin 25 can be sufficiently projected from the upper face of clamp plate 30 by slightly lowering clamp plate 30. Since the vertical movement of clamp plate 30 is very small, the maximum height of work to be machined, which is determined by the height of the machining head of the machine tool, is not extremely limited by the vertical movement of clamp plate 30.

Referring to FIGS. 1 and 3 stopping unit 5 has temporary positioning lever 63. When pallet 4 is transferred onto clamp plate 30 at the highest level, lever 63 temporarily stops pallet 4 in a position at which positioning holes 15 are almost right above positioning pins 25. Temporary positioning lever 63 is pivotally mounted on a pair of parallel brackets 65 fixed to the forward end of clamp base 20 as viewed from the direction in which pallet 4 is transferred. Friction member such as dish spring 66 is provided between lever 63 and opposed face of each bracket 65, whereby lever 65 is held in the present position unless an external force is exerted to it. Lever 63 has hook 64 at its one end and upright engagement face 68 formed above its axis. To the forward end of pallet 4 is fixed engagement projection 70 which can engage temporary positioning lever 63. The free end of engagement projection 70 is formed with upright engagement face 72. Engagement projection 70 has downwardly directed engagement groove 73 and downwardly directed urging face 71.

In the initial position of temporary positioning lever 63, it is inclined leftwardly downwardly, as shown by dashed lines in FIG. 3. When pallet 4 is transferred to clamp plate 30 held at the highest level, engagement face 72 located at the free end of engagement projection 70 is brought into contact with upright face 68 of lever 63 to rotate lever 63 clockwise in FIG. 3, and hook 64 of lever 63 is received in engagement groove 73. When temporary positioning lever 63 is once received in engagement groove 73, it is held in this state by the frictional force produced between lever 63 and dish springs 66 unless an external force is applied to lever 63 to rotate the same counterclockwise. In this state the axis of positioning hole 15 is slightly displaced rearwardly of the pallet 4 from the axis of corresponding positioning pin 25 in clamping device 1. Positioning hole 15 has conical face 15A formed at its lowermost end. Therefore, as clamp plate 30 is lowered by rotating clamp operation handle 43 from position in FIG. 3 to position B in FIG. 6, the upper end of each positioning pin 25 which is being raised contacts the corresponding conical base 15 of hole 15 and is guided by it into the corresponding positioning pin 15 thereby to be received in the pin 15. Pallet 4 is retracted rearwardly on clamp plate 30 by the amount equal to the distance between the axes of holes 15 and corresponding pins 25.

At the same time, engagement projection 70 is also lowered, and its urging face 71 pushes vertical engagement face 67 of lever 63 downward. Simultaneously, pallet 4 is slightly displaced rearwardly and face 72 of engagement projection 70 is separated from face 72 of lever 63. Thus, lever 63 is rotated counterclockwise in FIG. 3 and returns to the initial position shown in FIG. 6, whereupon hook 64 of lever 63 is disengaged from engagement groove 73 of pallet 4. Now, positioning pin 25 is received in positioning hole 15 of pallet 4, and pallet 4 is held by clamping device 1. When temporary positioning lever 63 is returned to the initial position, lever 63 is held in this state by the frictional braking forces of dish springs 66 unless it is applied by an external force which rotates lever 63 in the engagement direction. Thus, when clamp plate 30 is raised by returning clamp operation handle 43 from position B to position A and pallet 4 with a machined work (not shown) mounted thereon becomes free from clamp base 20, engagement groove 73 of pallet 4 remains spaced apart from hook 64. For this reason, pallet 4 is removed from clamp plate 30 without being interfered by lever 63.

As described above, temporary positioning lever 63 is upwardly rotated when engagement projection 70 of pallet 4 is transferred to clamp plate 30 when it is held at the highest level, and is downwardly rotated by engagement projection 70 when clamp plate 30 is lowered. After it has been rotated upwards or downwards, lever 63 is held in its position unless it experiences subsequent external force. For this reason, pallet 4 is temporarily positioned automatically when pallet 4 is transferred onto clamp plate 30. Pallet 4 is automatically released from the temporarily positioned state in response to the rotation of shaft 40 in the direction in which clamp plate 30 is lowered. Therefore, the operations of levers 63 need not be performed separately for temporarily positioning pallet 41 and for releasing pallet 4. Particularly, when downwardly directed urging face 71 is formed, the downward force is collectively applied to vertical engagement face 67 of temporary positioning lever 63, whereby temporary positioning lever 63 is rotated downward smoothly and easily.

Dish springs 66 may be replaced with other frictional members. Further, it is possible to provide dish spring 66 or other frictional member between the shaft of lever 63 and holes which are formed in brackets 65 and in which the shaft is inserted.

In this embodiment, worktable 2 is provided with a plurality of parallel T-shaped grooves (not shown) which are arranged at a predetermined interval based on the JIS (Japanese Industrial Standards) or other standards. To secure clamping device 1 to worktable 2, elongated shouldered through holes 80 are formed so as to cross the respective T-shaped grooves and to be arranged in a staggered fashion as shown in FIG. 1. At least two set screws 81 are inserted in corresponding through holes 80 and screwed into T nuts 82 (FIGS. 2, 5) disposed in the corresponding T-shaped grooves. Clamp base 20 has two stepped portions 83 formed on each side. Arms 86 rest on or are fixed onto stepped portions 83. Set screws 85 penetrating arms 86 are screwed into T nuts 84 received in the T-grooves. Thus, upon tightening set screws 85, clamping device 1 is fixed to worktable 2. In order to secure clamping device 1 to worktable 2 in parallel to the T-grooves, a pair of keys 87 received in a T-shaped groove are fixed to the lower face of clamp base 20.

For the adjustment of the distance between the upper face of support rail 37 and support face 38, clamp operation handle 43 is set to position B, and clamp plate 30 is set to the clamping position shown in FIG. 6. Then, set screws 32 are removed, and center block 31 is rotated to move crank holder 51 vertically with respect to section 31A to separate support faces 38 from support rails 37 to such an extent that they clamp plates 13 of pallet 4 block 31. For this adjustment, it is desired to dispose test plates or gauges (not shown) having a thickness substantially equal to the thickness of plate 13 between support rail 37 and support face 38. In this case, support rails 37 and support faces 38 are brought into close contact with the respective upper and lower faces of the test plates or the gauges by turning center block 31 in the direction in which crank holder 51 is lowered. After the test plates or the gauges are removed from the spaces between support rails 37 and support faces 38, center block 31 is further turned in the screwing direction until the holes of set screws 32 circumferentially formed in the flange of center block 31 at an interval of 60° align with the closest or next closest female screws 54. Then, set screws 32 are inserted into their holes and female screws 54, whereby center block 31 is secured to crank plate 30. In this way, the distance between support rail 27 and support face 38 is set to a dimension, which corresponds to the thickness of plate 13 minus an interference. Finally, center block 31 is pushed downwards by push screw 56 to bring the flanks of screws of crank holder 51 and center block 31 to press against each other, thereby eliminating a play existing therebetween.

Thus, the manufacturing errors of the components defining the distance between rails 37 and faces 38 and cumulative assembling errors thereof are eliminated and this distance is set to a predetermined value.

Now, the clamping operation will be described.

First, clamp operation handle 43 is set to position A as shown in FIG. 3, and clamp plate 30 is set to the highest level. Then, pallet 4 is transferred to clamp plate 30. When engagement face 72 of engagement projection 70 contacts upright face 68 of lever 63, lever 83 is rotated upwardly from the initial position shown by dashed lines in FIG. 3 such that hook 64 is received in engagement groove 73. Thus, pallet 4 is automatically temporarily positioned and positioning holes 15 are almost right above positioning pin 25 of clamping device 1.

Subsequently, as clamp operation handle 43 is turned from position A in FIG. 3 toward position B in FIG. 6, positioning pins 25 meshed with gears 61 rotated together with shaft 40 project from the upperface of crank plates 30 and are received in positioning holes 15 of pallet 4, whereby temporarily positioned pallet 4 is positioned to a predetermined machining position.

Concurrently with this operation, clamp plate 30 is gradually lowered in accordance with eccentricity I between shaft 40 and eccentric 48 and extent of rotation of shaft 40. When clamp operation handle 43 is brought to position B, each plate 13 is clamped by support rail 37 and support face 38, so that pallet 4 is held. In this state, eccentric 48 is applied by a clockwise force produced by the wedging action between eccentric 48 and crank lever 50. Thus, unless clamp operation handle 43 is turned in the counterclockwise direction, shaft 40 is not rotated counterclockwise by vibrations or other causes, and pallet 4 remains held in a position corresponding to position B of clamp operation handle 43.

As clamp plate 30 is lowered, urging face 71 presses arm portion 67 downward. As a result, temporary positioning lever 63 is moved downwards by urging face 71 of engaging projection 70, and finally returns to the initial position shown in FIG. 6. In consequence, hook 64 is disengaged from engagement groove 73, and hence, pallet 4 is completely released from the temporarily positioned state. Temporary positioning lever 63 which has returned to the initial position maintains its state by the frictional braking action of dish springs 66 unless an external force is applied to lever 63.

After the work on pallet 4 has been machined, plates 13 of pallet 4 are unclamped. To this end, clamp plate 30 is lifted to the highest level as shown in FIG. 3 by returning clamp operation handle 43 from position B to position A. By doing so, engagement groove 73 of pallet 4 is further separated from hook 64 of temporary positioning lever 63, since lever 63 is held in the initial position. Now, temporary positioning lever 63 does not interfere with the operation of transferring pallet 4 from clamp plate 30. Now, temporary positioning lever 63 is ready for the next temporary positioning operation.

This invention is not limited to the embodiment described above, and includes various changes and modifications without departing from the scope and spirit of the invention.

For example, eccentric 40 fitted on crank lever 50 and gears 61 engaging with positioning pins 25 can be formed integrally with shaft 40.

Further, crank lever 50 can be directly connected to clamp plate 30. Moreover, a driving device using a slider link mechanism, a lead screw mechanism or a hydraulic or pneumatic actuator can be employed for moving clamp plate 30 vertically with respect to clamp base 20.

Temporary positioning lever 63 can be provided in a suitable position other than the forward end of clamp base 20. In this case, engagement groove 73, engagement face 72 and downwardly directed urging face 71 can be formed on the suitable portions of pallet 4.

In the above embodiment, supporting face 38 as a second clamping element is movable vertically with respect to supporting rail 37 as a first clamping element. But the invention is applicable to a clamping device, in which a second clamping element is movable horizontally with respect to a first clamping element such that an article is held between these two elements when the second clamping element is moved towards the first clamping element. Further, the article to be held is not limited to a pallet.

What is claimed is:

1. A clamping device comprising:
   a clamp base having a face;
   first clamping means provided on said face of said clamp base;
   second clamping means facing said clamping means and movable in directions toward and away from said first clamping means and co-operating with said first clamping means to hold an article when said second clamping means is moved toward said first clamping means;
   a shaft rotatably supported on said clamp base and extending substantially at right angles to said directions;
   an eccentric formed on said shaft;
   a crank holder connected to said second clamping means for adjusting a distance between said first and second clamping means; and
   a crank lever having one end supported on said eccentric and the other end supported on said crank holder.

2. The clamping device according to claim 1, wherein said first clamping means comprises supporting rails;
   second clamping means is a clamp plate disposed above said clamp base and parallel therewith;
   said article is a pallet to be transferred to and from said clamp plate and formed with downwardly open positioning holes;
   said clamp base has positioning pins extending towards said clamp plate and substantially aligned with said positioning holes when said pallet is located in a predetermined position on said clamp plate; and
   moving means is provided between said positioning pin and said shaft, for inserting said positioning pins into said positioning holes when said clamp plate is moved towards said supporting rails and for disengaging said positioning pins from said positioning holes when said clamp plate is separated from said supporting rails.

3. The clamping device according to claim 2, wherein said moving means comprises gears provided on said shaft and racks formed on said positioning pins and meshing with said gears.

4. The clamping device according to claim 2, wherein said clamp plate has an adjusting block provided therein and movable in said directions for making a fine adjustment of said distance, and said crank holder is screwed in said adjusting block.

5. The clamping device according to claim 4, wherein said adjustable block makes a screw engagement with said clamp plate, is rotatable with respect thereto for said fine adjustment and includes means for fixing said adjusting block to said clamp plate after said fine adjustment is made.

6. The clamping device according to claim 5, wherein said fixing means comprises a plurality of female screws formed in said adjusting block and arranged circumferentially and equidistantly therein, and a plurality of male screws engageable with said female screws, the number of said female screws being a multiple times of the number of said male screws.

7. The clamping device according to claim 2, wherein said clamp base includes engagement means for temporarily positioning said pallet on said clamp plate upon receiving said pallet transferred to said clamp plate when said clamp plate is most spaced apart from said clamp base and for disengaging from said pallet when said positioning pins are inserted into said positioning holes.

8. The clamping device according to claim 7, wherein said engagement means comprises an engagement projection provided on an end of said pallet which faces said clamp base when said pallet is transferred onto said clamp base, and a temporary positioning lever pivoted to an end of said clamp base which said end of said pallet on said clamp base faces, said engagement projection abutting against said temporary positioning lever when said positioning holes align with said positioning pins and rotating said temporary positioning lever such that said temporary positioning lever engages said engagement projection.

9. The clamping device according to claim 8, wherein said engagement means comprises a pair of parallel brackets provided on said end of said clamp base, said temporary positioning lever disposed between said pair brackets and pivoted thereto, means for holding said temporary positioning lever in a present position unless an external force is applied to said temporary positioning lever, and said engagement projection;
   said temporary positioning lever has two ends, one end being pivoted to said brackets and being formed with an upright face facing said engagement projection, the other end defining a hook and an arm portion provided between said upright face and said hook; and
   said engagement projection has an engagement groove for receiving said hook, an engagement face for engaging said upright face to rotate said temporary positioning lever such that said hook is received in said engagement groove, and an urging face for pressing said arm portion to rotate said temporary positioning lever such that said hook is disengaged from said engagement groove when said clamp plate approaches said clamp base.

10. The clamping device according to claim 9, wherein said holding means is a frictional member including a disk spring provided between said brackets and said temporary positioning lever.

* * * * *